(12) United States Patent
Schaub et al.

(10) Patent No.: US 7,716,092 B2  
(45) Date of Patent: May 11, 2010

(54) USE OF SEPARATE RIB LEDGERS IN A COMPUTERIZED ENTERPRISE RESOURCE PLANNING SYSTEM

(75) Inventors: Thomas M. Schaub, Antibes (FR); Andreas Schaefer, Mougins (FR); Horst Schnoerer, Angelbachtal (DE)

(73) Assignee: SAP AG, Walldorf (DE)

( * ) Notice: Subject to any disclaimer, the term of this patent is extended or adjusted under 35 U.S.C. 154(b) by 1643 days.

(21) Appl. No.: 10/740,558

(22) Filed: Dec. 22, 2003

(65) Prior Publication Data

US 2005/0137946 A1 Jun. 23, 2005

(51) Int. Cl.  
*G06Q 40/00* (2006.01)

(52) U.S. Cl. .......................................... 705/30; 705/35

(58) Field of Classification Search .................... 705/30  
See application file for complete search history.

(56) References Cited

U.S. PATENT DOCUMENTS 6,128,602 A * 10/2000 Northington et al. .......... 705/35

2002/0174006 A1 * 11/2002 Rugge et al. .................. 705/10

OTHER PUBLICATIONS

2000 Development Requests at HERTUG (Higher Education and Research Institutions), downloaded on May 5, 2008.*  
Official Answer to 2000 Development Requests, downloaded on May 5, 2008 http://web.mit.edu.her/devreq/dev_req_2001_official_answer.htm.*  
Banham, Russ, "Better Budgets," Feb. 2000, Journal of Accountancy, v189n2, pp. 37-40.*

* cited by examiner

*Primary Examiner*—Narayanswamy Subramanian  
*Assistant Examiner*—Seth Weis  
(74) *Attorney, Agent, or Firm*—Kenyon & Kenyon LLP

(57) ABSTRACT

Enterprise management applications perform a "revenues increasing the budget" (RIB) operation on general ledger data and store elements of the general ledger data that have a RIB effect in another ledger, called the "RIB ledger". RIB ledgers may include sets of RIB rules, storage for documents reflecting all relevant delta values together with the corresponding links to the underlying original transaction documents as well as storage for all relevant aggregated data. Accordingly, when audit operations are performed for RIB budget increases, relevant transaction data is readily available in the RIB ledger. Such copies of the data are more easily accessed than through a search of the larger set of general ledger data, thus facilitating and accelerating use of the RIB techniques in an online system.

16 Claims, 5 Drawing Sheets

500

| | SOURCE ADDRESS 540 | TRANSFORM 550 | | DESTINATION ADDRESS 560 |
|---|---|---|---|---|
| | | | REF. REV. PTR 551.1 | |
| 510 → | A1, A1.1, A1.2, A1.3 | $0.5 PER $1 IN REVENUE ABOVE REF. VALUE 551.1 | | A1 |
| 520 → | C, C1, C2, C3, C4 | $1 PER $1 IN REVENUE UP TO REF. VALUE 552.1 | REF. REV. PTR 552.2; SCAL. COEFF. 552.2A | C [60%], C1 [10%], C2 [10%], C3 [10%], C4 [10%] |
| 530 → | C5 | $1 PER $1 IN REVENUE UP TO $150,000  553 | | C5 |

600

USE OF SEPARATE RIB LEDGERS IN A COMPUTERIZED ENTERPRISE RESOURCE PLANNING SYSTEM

BACKGROUND

Embodiments of the present invention provide a "revenues increasing the budget" feature for financial management software modules that are commonly found in enterprise management applications.

Enterprise management applications ("EMAs"), such as the R/3 application commercially available from SAP AG, permit computer systems to manage the business operations of some of the largest organizations in the world. EMAs include several integrated systems, including financial management systems, materials management systems, financial accounting systems, fund management systems, asset management systems, and the like.

"Ledgers" are a well known component of financial management software. Generally, a ledger represents a view into general transaction data according to a predetermined filtering scheme. For example, a first ledger, typically a general ledger, may be established to distinguish different expense types such as materials, infrastructure, salary, etc., according to a predetermined chart of accounts. A second, different ledger may be established to distinguish (and thus track) different projects or funds managed by the organization according to perhaps different accounting principles. Other ledgers might be set up to reflect additional aspects of the transaction data.

"RIB" techniques are known per se in financial management software. RIB is an acronym for "revenues increasing the budget." In many financial applications, expenditure budgets of a predetermined business unit such as an organization or department are based upon revenues of that business unit. Financial management software having RIB management features track revenues and determine changes to expenditure budget based upon predetermined rules.

A RIB rule represents a transform from revenue information to expenditure budget information. Within the RIB rule, there may be defined:

source addresses, representing locations of revenues,
destination addresses, representing locations of expenditure budget,
transform calculation, defining how expenditure budget is derived.

Commonly, the transform calculation may define a transform coefficient (e.g., $1 increase in expenditure budget for every $2 in revenue), certain thresholds that must be exceeded before any increase in expenditure budget occurs (e.g., expenditure budget increased only after revenues exceed $100,000), or certain filtering conditions that occur as part of the calculation (e.g., increased expenditure budget occurs only for realized incoming payments, as opposed to customer invoices that have not been paid yet).

In known RIB systems, increases of the expenditure budget are calculated directly from general ledger data. Modern EMAs, however, may operate on transaction databases having many millions of transaction items located therein. Depending on the rule by operating on the raw data, it might be not possible to perform the RIB rule sufficiently fast to have near real time calculation of RIB increases to budgetary values. Also auditing possibilities are limited. Accordingly, there is a need in the art for a RIB calculation feature that generates RIB budgetary values in near real time and tracks all the changes to allow for a complete auditing.

DETAILED DESCRIPTION

Embodiments of the present invention provide a RIB management system that permits calculation of RIB budgetary increases in near real time. As an EMA accepts new transactions that reflect posted revenue, the RIB management system determines whether the posted revenue is relevant to any RIB rule. If so, the RIB management system executes the RIB rule on the new revenue item, generating an incremental increase in budget. A "RIB ledger," which is separate from and provided in addition to a general budget ledger, may store an aggregation of relevant revenues, an aggregation of reference revenue budget and the overall budget increase resulting from the RIB process up to that point in time. Each change of the RIB ledger can be documented using a corresponding line item for reporting purposes. The line item itself can refer to the original document (either budget or revenue posting) that caused the RIB ledger change, thus allowing for a complete change history reporting which might be requested, for example, for auditing reasons.

Figure 1:
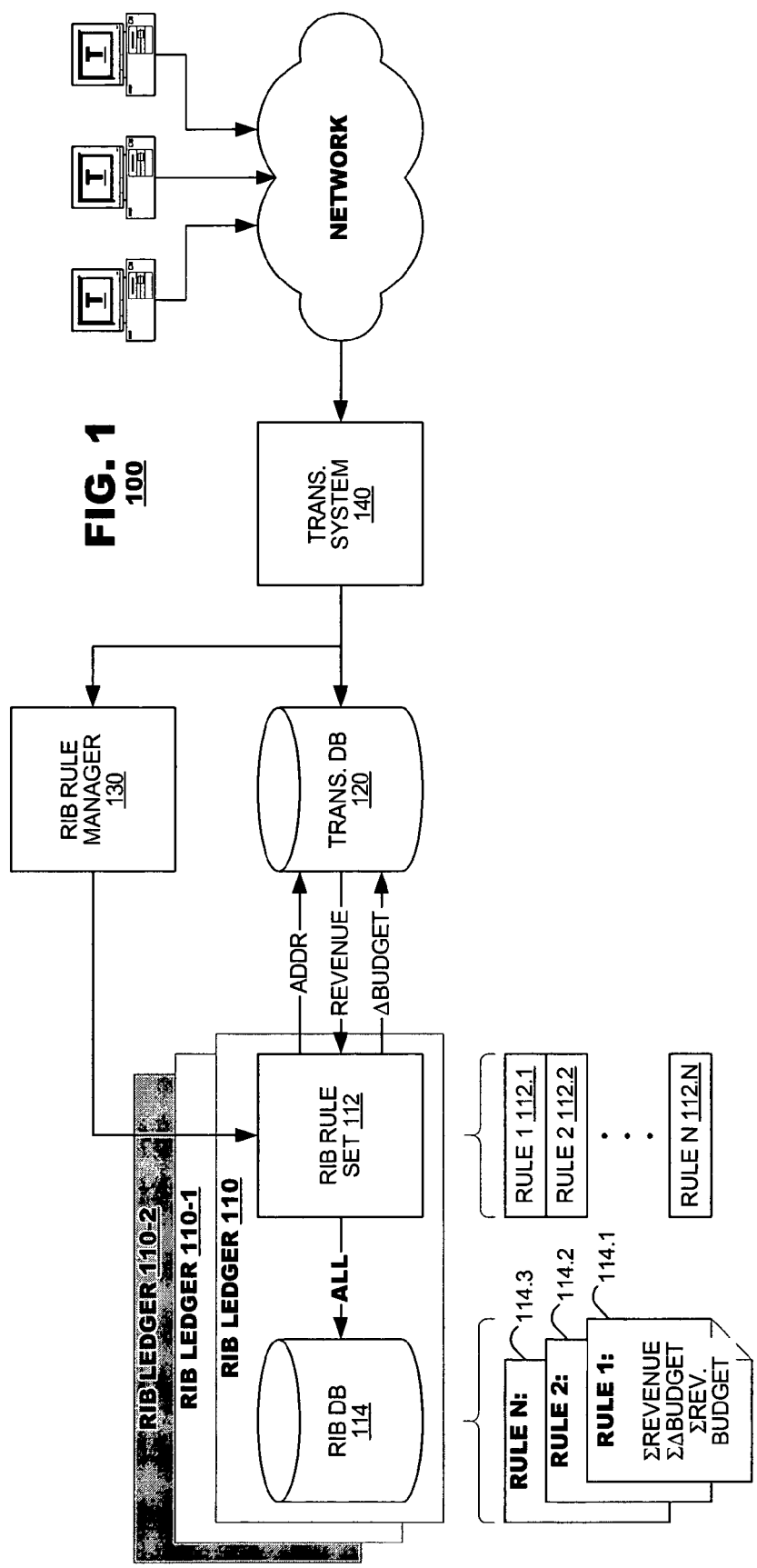
FIG. 1 is a functional block diagram of a RIB management system according to an embodiment of the present invention.

FIG. 1 is a functional block diagram of a budgeting component 100 of a computerized accounting system according to an embodiment of the present invention. The system 100 may operate according to one or more "RIB rules" in which expenditure budget is generated from posted revenues realized by an organization.

As shown, the system 100 may include a RIB ledger 110, a transaction database 120, a RIB rule manager 130 and a transaction system 140. The RIB ledger 110 may include a RIB rule set 112. The RIB rule set 112 typically is an object representing rules operable for the RIB ledger 110. Each RIB rule 112.1-112.N can include source addresses identifying locations of revenue items stored in the transaction database 120 that will potentially increase expenditure budget values. RIB rules also can include budget transforms, identifying how budget values are to be increased based upon new revenue (e.g., $1 of budget for every $2 of revenue, all revenue over $100M to be available as budget increase, etc.) and, of course, destination addresses in the transaction database 120. These destination addresses identify locations in the transaction database 120 where new expenditure budget items generated pursuant to the RIB rules may be stored.

The system 100 may be provided in communication with one or more terminals T via a communication network. During operation, the transaction system 140 receives transaction requests from one or more terminals and validates them. Typically, operators at the terminals T generate 'documents' representing one or more transactions. Modern ERP systems include multiple modules for processing and validating transactions of different types. Such functionality may be incorporated into the transaction system 140. Documents for validated transactions may be stored in the transaction database 120 and values from different transactions may be stored in revenue entries therein. In this regard, the operation of a RIB rule system is well known.

Embodiments of the present invention introduce a RIB database 114 into a RIB ledger. The RIB database 114 may include objects 114.1-114.N for each RIB rule 112.1-112.N in the RIB rule set 112, which stores data relevant to the corresponding RIB rule. Thus, object 114.2 in the RIB database 114 may include an aggregation of all revenue values on which RIB rule 112.2 is based ($\Sigma$REVENUE). Objects 114.1-114.N also may include an aggregation of all delta budget values calculated from earlier evaluations of the RIB rule ($\Sigma\Delta$BUDGET). If applicable to the corresponding RIB rule, an object 114.2 also may include an aggregation of reference revenue budget ($\Sigma$REV BUDGET); this may occur, for example, when RIB rules require a comparison to be made between actual revenue and reference revenue budget values before awarding a RIB increase to an expenditure budget. The structure of the RIB database, therefore, permits a fast calculation of additional delta budget values that may occur from a new transaction, which can lead to a near-real-time system.

The RIB rule manager 130 may operate upon transaction data to determine if a new transaction is relevant to any RIB rule (112.1-112.N). In so doing, the RIB rule manager 130 either may evaluate directly revenue items of a new transaction (or document) to be added to the transaction system 140 or may monitor changing aggregated revenue entries within the transaction database 120. When a new document causes a change of an aggregated revenue entry in the transaction database 120 or if an aggregated revenue entry changes, without direct relation to a specific document added to the transaction system 140, the RIB rule manager 130 may determine whether the entry is relevant to any RIB rule (112.1-112.N). If so, the RIB rule manager 130 may cause the RIB rule (say, rule 112.N) to be executed by accessing historical data stored in the corresponding object 114.N of the RIB database 114. As noted, an object 114.N of the RIB database 114 may store: 1) aggregations of actual revenues that are relevant to the RIB rule 112.N, 2) if appropriate to the corresponding RIB rule 112.N, aggregations of reference revenue budget, and 3) overall expenditure budget increases from prior operation of the RIB rule 112.N. Evaluation of the RIB rule 112.N may generate a delta (expenditure) budget value ($\Delta$budget), which may update budgetary values in the transaction database 120 and in the RIB database 114 of the RIB ledger. The RIB database object 114.N also may have stored therein data referring to the posted transaction that caused the RIB change, such as updates to the aggregated values of the relevant actual revenues and of the reference revenue budget, and optionally single revenue items or reference revenue budget items, and even pointers to the original documents.

As noted, RIB rules vary in type and content. In one embodiment, a RIB rule may require a comparison between actual revenue values and a reference revenue budget value. In the example provided above where expenditure budget is permitted to increase only after revenues exceed $100,000, the $100,000 value may be stored in the transaction database 120 as a reference revenue budget value. Within the RIB rule set 112, the corresponding RIB rule (say, rule 112.1) may include a pointer to the reference revenue budget values in the transaction database 120. The corresponding RIB database object 114.1 also may store a copy of the reference revenue budget value ($\Sigma$REV BUDGET). Of course, for RIB rules that do not involve such a comparison, there may be no need to store such pointers or reference values in the RIB rule or the RIB database object.

Provision of a separate RIB database also permits filtering of transaction data based on predetermined criteria. This permits for fast access to the filtered data, which can facilitate use of the RIB techniques in an online system. During use, a general ledger database may store records for millions of transactions. An iterative search for transactions that match preselected attribute data (e.g., all transactions of a given type or all transactions entered for a given group of business partners), likely would be too slow to be performed as an online check. RIB rules may be defined, however, for preselected transaction attribute data. In so doing, the RIB database may store data responsive to the defined filtering conditions. The contents of the RIB ledger database (in particular aggregations of relevant revenue and of reference revenue budget) would be assembled as new transaction data is entered. Access to such filtered data is made much faster than an iterative search through the transaction database or even a general ledger database.

According to an embodiment, the system 100 may include multiple RIB ledgers (e.g., 110, 110-1, 110-2). In this embodiment, each RIB ledger may include its own RIB rule set 112 and RIB database 114. The RIB ledgers each may operate independently from each other, so that execution of a RIB rule in one RIB ledger may but need not be accompanied by execution of a RIB rule in another RIB ledger.

In one embodiment, multiple ledgers 110-1, 110-2 permit the EMA to operate under different, independent RIB scenarios. For example, an organization may define two expenditure budgets to represent its operations: an operating budget and a budget estimate that may be a more optimistic estimate of its operations. The organization may define separate RIB rules to apply to each of the budgets. Provision of multiple ledgers, each of which operates independently of the other, permits an EMA to accommodate such operations.

Figure 2:
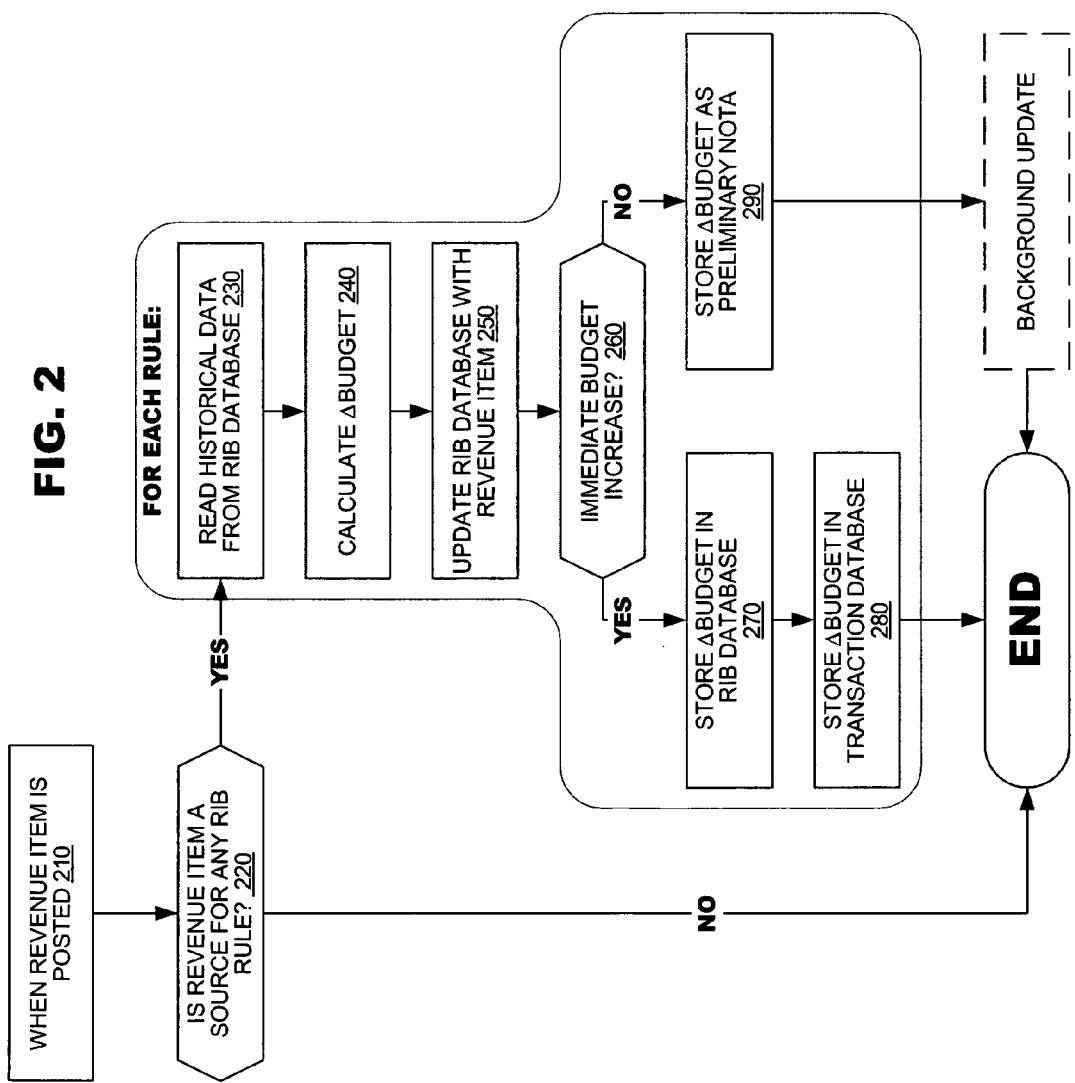
FIG. 2 is a process flow illustrating RIB rule execution according to an embodiment of the present invention.

FIG. 2 is a flow diagram that illustrates RIB operations that may be performed by the system of FIG. 1. According to an embodiment, when a new revenue item is posted, the system determines whether the revenue item is a source for any RIB rule (boxes 210, 220). If it is, the system executes the corresponding RIB rule(s). In doing so, the method may read historical data from a corresponding record object of the RIB database (box 230). The historical data represents, in combination with the data of the new revenue item, the 'operands' of the executing RIB rule. It may include, as noted, aggregations of relevant revenue values previously posted in the system, aggregations of all delta budget values posted after earlier evaluations of RIB rules and perhaps reference revenue data on which a threshold comparison is to be made. The system may calculate a $\Delta$budget value as determined by the RIB rule (box 240) and update the corresponding object of the RIB database with values from the revenue item (box 250). For example, the revenue aggregation may be supplemented to reflect the new revenue admitted to the system. Additionally, copies of transaction documents or pointers thereto may be stored in the object as references to the transaction data or to the original documents on which the calculation of the new $\Delta$budget value is based.

If the system is configured to perform an immediate budget increase (box260), the method also may cause the $\Delta$budget value to be stored in the RIB database object and the transaction database (boxes 270-280). If not, the method may store the $\Delta$budget item to a buffer (box 290; e.g. as preliminary nota) for later storage. Typically, such buffering is performed if the system is configured to perform background updates of system values on a periodic basis (e.g., hourly, daily or weekly). Instead of a background process, other processes may be used to store the calculated $\Delta$budget values in the RIB database and the transaction database in a later step. Such processes may be started manually or automatically, after the revenue item has been posted.

Figure 3:
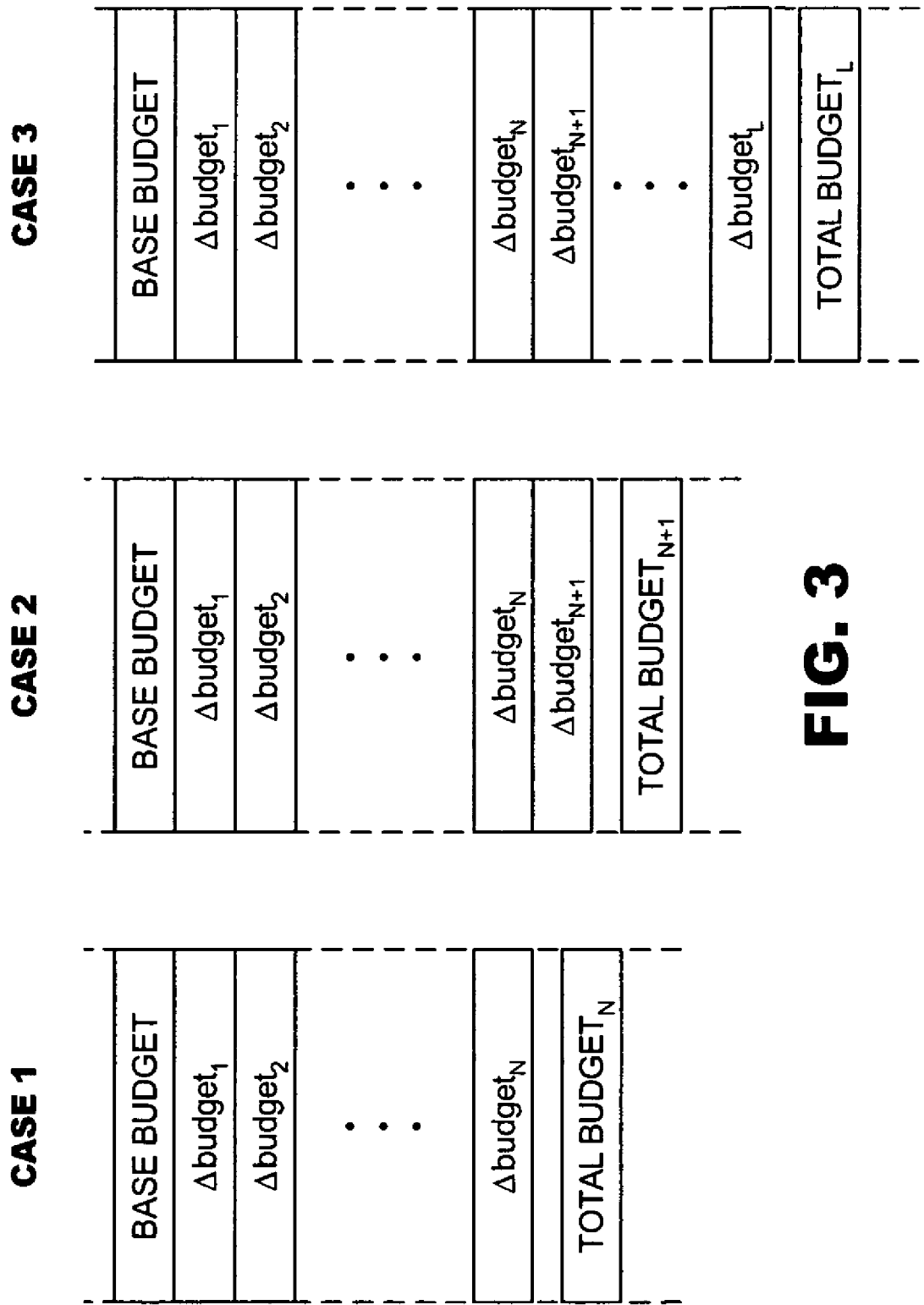
FIG. 3 illustrates exemplary RIB-generated budget items.

FIG. 3 provides an example of how a budget item may evolve in the transaction database 120 or in a RIB ledger database 114 over time. In case 1, there have been N iterations of the method performed on the budget entry, each of which generates an incremental Δbudget value (Δbudget$_1$-Δbudget$_N$). A total budget value is available, labeled TOTAL BUDGET$_N$, which represents the sum of all Δbudget values and a base budget, which may have been defined for the budget entry through some other means. Case 2 represents the budget item following posting of an N+1$^{st}$ revenue item that has RIB ramifications for the budget item. When the Δbudget$_{N+1}$ value becomes available, it may be stored in the database and a new TOTAL BUDGET value (TOTAL BUDGET$_{N+1}$) may be obtained simply by adding the Δbudget$_{N+1}$ value to the previous value, TOTAL BUDGET$_N$. The new value, TOTAL BUDGET$_{N+1}$, may then be stored in the database, replacing the old value.

Case 3 represents the budget items following posting of an L$^{th}$ revenue item that has RIB ramifications for the budget item. When the Δbudget$_L$ item becomes available, it may be stored in the database and a new TOTAL BUDGET value may be obtained simply by adding the Δbudget$_L$ value with the previously available TOTAL BUDGET$_{L-1}$ value to obtain a new value TOTAL BUDGET$_L$. As can be seen, even as the number of Δbudget items increases to several tens of thousands of entries, which can be typical for EMAs, the TOTAL BUDGET value may be computed from a very small number of source operands, namely the new transaction data as well as the previous TOTAL BUDGET. This renders the computation process very fast and can lead to near real-time results for such information.

In addition to the budget items illustrated in FIG. 3, a RIB database stores additional types of data. First, the RIB database stores aggregated values of relevant actual revenues and aggregated values of reference revenue budget. Second, it may store data representing the revenue items or the revenue budget items that caused an update of the aggregation values mentioned before. The RIB database also may store references to the original documents that generated the revenue items or revenue budget items or to the budget documents that may be created by the RIB process itself in order to increase the budget values of both databases. For example, common revenue documents include bills, sales orders, credit memos and the like. The electronic documents themselves are stored in the transaction database 120. Additionally, other documents may be created in the RIB database 114 as desired to hold references to the original documents of the transaction database and to record all RIB relevant information online.

In addition to simplifying the calculation of the incremental Δbudget values of the RIB process, the foregoing embodiments are convenient because they also provide a data structure that permits an operator to view a history of RIB relevant data values and the transactions that created them. Δbudget items, revenue items and supporting documents may be linked in the RIB database to permit easy access and review, for example for auditing purposes.

As noted, the transaction database 120 of FIG. 1 may store both revenue items and budget items. Conventionally, it is appropriate to consider revenue items to be stored in a revenue (budget) data structure and expenditure items (to which the Δbudget values belong) in a (n expenditure) budget data structure. These two (budget) data structures can have, in some embodiments, similar structures.

Figures 4, 5:
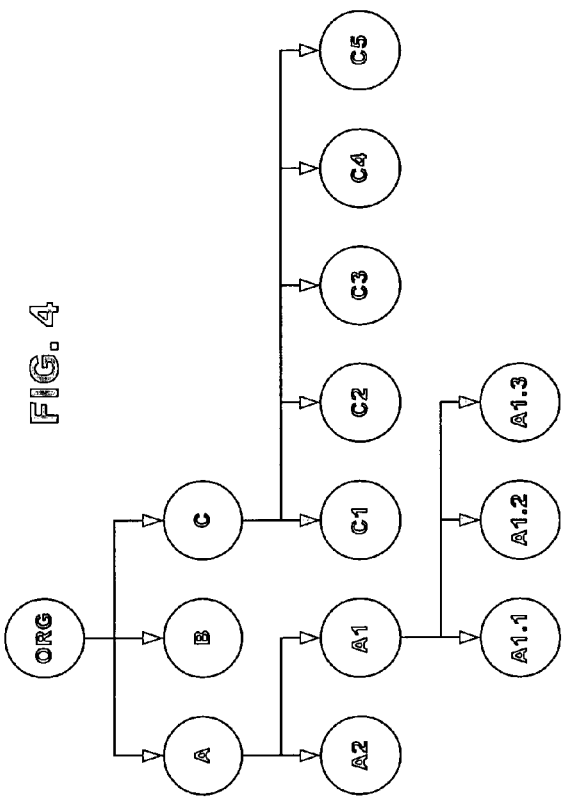
FIG. 4 illustrates an exemplary budget data structure for use with embodiments of the present invention.
FIG. 5 illustrates exemplary RIB rules for use with embodiments of the present invention.

FIG. 4 illustrates a simplified budget data structure that may find application with the foregoing embodiments. In this budget data structure, an organization is shown having three departments A, B and C. Budget and revenues for department A includes elements A1 and A2. Element A1 further includes sub-elements A1.1, A1.2 and A1.3. Budget and revenues for department C is comprised of elements C1, C2, C3, C4 and C5. This budget data structure may be used for expenditure budget items including the Δbudget values and for revenue items.

FIG. 5 provides examples of RIB rules 510, 520, 530 that may be used with the budget data structure of FIG. 4. In one embodiment, each RIB rule 510, 520, 530 may include fields for source address(es) 540, a budgetary transform 550 and destination address(es) 560. Thus, as illustrated, RIB rule 510 uses revenue items related to nodes A1, A1.1, A1.2, and A1.3 as operands and applies a transform that generates $0.50 for every $1 of revenue posted over a lower limit value calculated from a reference budget value. For such a rule, the budgetary transform field 550 may include a transform coefficient in field 551.1 (in this case it would be 0.50) and a reference revenue budget pointer 551.2. A reference budget value (e.g., $100,000) may be stored in the transaction database 120 at a location specified by the pointer 551.2. If the total revenue exceeds the reference budget value, a Δbudget value may be calculated by multiplying the surplus revenue value by the transform coefficient specified in field 551.1, e.g. by the value of 0.50 following the example above. Budget items generated from this RIB rule 510 are stored in the expenditure budget at node A1, as defined in the destination field 560. Exemplary RIB rules 520, 530 are shown for various other nodes. Some may include reference revenue budget pointers and transform coefficients; others may not.

In another embodiment, a reference revenue budget pointer 552.2 may include a scaling coefficient (552.2A) identifying a scaling of the reference revenue budget pointer to be performed before thresholding. If a RIB rule defined a scaling coefficient of 0.9 and an applicable reference revenue budget value were $100,000, then Δbudget values would be awarded as soon as recorded revenue exceeded $90,000 (0.9*$100,000). Again, some RIB rule may include scaling coefficients but others need not, depending on the RIB rules established by the organization.

In one embodiment, the destination field 560 of a rule may identify several destination addresses to which Δbudget may be applied, for example, identifying percentages for a distribution of the resulting budget increase. Rule 520 illustrates an example of this embodiment.

In another embodiment, where the revenue database and expenditure budget database have identical data structures, it is permissible to omit the destination address field from the RIB rule set. In this embodiment, a source address field 540 may identify locations of revenue items that are operands to the RIB rule. The highest node identified in the source address field 540 also may be used as the destination address. Thus, for RIB rule 510, node A1 would be considered the highest node identified in the source address field 540 and would be used as an address in the expenditure budget data structure for storage of the new budget item.

Figure 6:
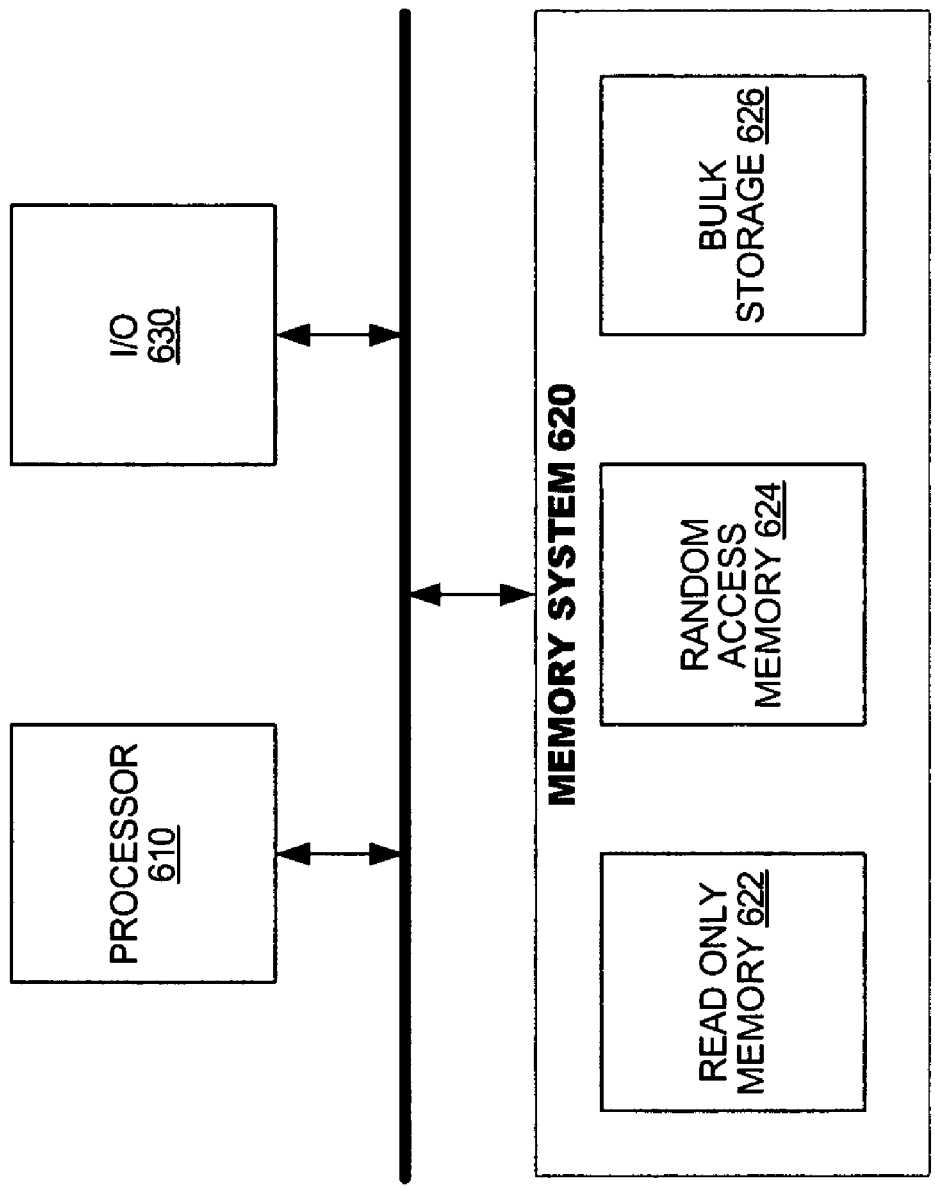
FIG. 6 illustrates a computing platform operable with embodiments of the present invention.

As noted, the foregoing embodiments may provide a software implemented EMA system. As such, these embodiments may be represented by program instructions that are to be executed by a server or other common computing platform. One such platform 600 is illustrated in the simplified block diagram of FIG. 6. There, the platform 600 is shown as being populated by a processor 610, a memory system 620 and an input/output (I/O) unit 630. The processor 610 may be any of a plurality of conventional processing systems, including microprocessors, digital signal processors and field programmable logic arrays. In some applications, it may be advantageous to provide multiple processors (not shown) in the platform 600. The processor(s) 610 execute program instructions stored in the memory system. The memory system 620 may include any combination of conventional memory circuits, including electrical, magnetic or optical memory systems. As shown in FIG. 6, the memory system may include read only memories 622, random access memories 624 and bulk storage 626. The memory system not only stores the program instructions representing the various methods described herein but also can store the data items on which these methods operate. The I/O unit 630 would permit communication with external devices, such as the communication network (FIG. 1) and other components.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A revenues increasing a budget (RIB) processing method, comprising:
   upon receiving, by a computer processor, an event posting a transaction in a transaction system and storing a representation of revenue corresponding to the transaction;
   determining, by the computer processor, that the transaction is relevant to one or more RIB rules in a RIB ledger that affects a budget entry in a transaction database; and
   for each RIB relevant rule:
      reading, by the computer processor, historical data associated with the respective RIB rule from an RIB database in the RIB ledger, wherein the historical data includes entries of data representing previous incremental budget changes corresponding to prior operations of the respective RIB rule and a total budget based on a base budget and previous incremental budget changes,
      calculating, by the computer processor, a new incremental budget change pursuant to the respective RIB rule and a new total budget,
      revising, by the computer processor, the historical data by adding a new entry for the new incremental budget change and updating the total budget with the new total budget in the RIB database, and
      updating, by the computer processor, the budget entry in the transaction database with the new total budget.

2. The method of claim 1, wherein the updating the budget entry is performed immediately after the calculation.

3. The method of claim 1, wherein the updating the budget entry is performed pursuant to a periodic system update.

4. The method of claim 1, wherein the determining comprises:
   searching across multiple sets of RIB rules of multiple RIB ledgers for rules that are relevant to the revenue item,
   performing each RIB rule identified from the search, and
   storing relevant data and RIB increases in RIB databases associated with the respective rules.

5. The method of claim 1, further comprising:
   storing documents of the transaction in the transaction database and
   storing in the RIB database pointers to locations of the stored documents in the transaction database.

6. The method of claim 1, wherein at lease one rule includes comparing an aggregation of revenue with a reference revenue budget value.

7. The method of claim 1, wherein the RIB processing method is used to increase a budget that authorizes an expense.

8. The method of claim 1, wherein the historical data further includes data representing a corresponding aggregation of a reference revenue budget, and an overall expenditure budget change corresponding to prior operations of the respective RIB rule, and revising the historical data further includes updating the corresponding aggregation of the reference revenue budget, and the overall expenditure budget change.

9. A computer readable medium storing program instructions related to revenues increasing a budget (RIB) that, when executed by a processing system, cause the system to perform a method comprising:
   upon receiving an event posting a transaction in a transaction database and storing a representation of revenue corresponding to the transaction,
   determining the transaction includes revenue that is relevant to one or more RIB rules in a RIB ledger that affects a budget entry in a transaction database; and
   for each RIB relevant rule:
      reading historical data associated with the respective RIB rule from an RIB database in the RIB ledger, wherein the historical data includes entries of data representing previous incremental budget changes corresponding to prior operations of the respective RIB rule and a total budget based on a base budget and previous incremental budget changes,
      calculating a new incremental budget change pursuant to the respective RIB rule and a new total budget,
      revising the historical data by adding a new entry for the new incremental budget change and updating the total budget with the new total budget in the RIB database, and
      updating the budget entry in the transaction database with the new total budget.

10. The medium of claim 8, wherein the budget entry in the transaction database is updated immediately after the calculation.

11. The medium of claim 9, wherein the budget entry in the transaction database is updated pursuant to a periodic system update.

12. The medium of claim 9, wherein the determination comprises:
   searching across multiple sets of RIB rules of multiple RIB ledgers for rules that are relevant to the revenue item,
   performing each RIB rule identified from the search, and
   storing relevant data and RIB increases in RIB databases associated with the respective RIB rule sets.

13. The medium of claim 9, wherein the method further comprises:
   storing documents of the transaction in the transaction database and
   storing in the RIB database pointers to locations of the stored documents in the transaction database.

14. The medium of claim 9, wherein the method further comprises:
comparing an aggregation of revenue with a reference revenue budget value.

15. The medium of claim 9, wherein the method is used to increases a budget that authorizes an expense.

16. The medium of claim 9, wherein the historical data further includes data representing a corresponding aggregation of a reference revenue budget, and an overall expenditure budget change corresponding to prior operations of the respective RIB rule, and revising the historical data further includes updating the corresponding aggregation of the reference revenue budget, and the overall expenditure budget change.

* * * * *